United States Patent [19]

Makino

[11] Patent Number: 4,682,351
[45] Date of Patent: Jul. 21, 1987

[54] CORDLESS TELEPHONE SYSTEM

[75] Inventor: Masayuki Makino, Tokyo, Japan

[73] Assignee: NEC Corporation, Japan

[21] Appl. No.: 790,329

[22] Filed: Oct. 23, 1985

[30] Foreign Application Priority Data

Oct. 29, 1984 [JP] Japan .............................. 59-225691

[51] Int. Cl.⁴ .......................................... H01H 11/08
[52] U.S. Cl. ........................................ 379/62; 379/61
[58] Field of Search ................ 179/2 EB, 2 E, 2 EA, 179/2 EC

[56] References Cited

U.S. PATENT DOCUMENTS

| | | |
|---|---|---|
| 3,564,150 | 2/1971 | Muller .............................. 179/2 EB |
| 4,031,330 | 6/1977 | van Leeuwer ................... 179/2 EB |
| 4,347,625 | 8/1982 | Williams .............................. 455/17 |
| 4,411,017 | 10/1983 | Talbot .................................... 455/26 |
| 4,517,561 | 5/1985 | Burke et al. ..................... 340/825.07 |
| 4,518,822 | 5/1985 | Martinez ............................ 179/2 E |

*Primary Examiner*—Robert Lev
*Attorney, Agent, or Firm*—Laff, Whitesel, Conte & Saret

[57] ABSTRACT

A cordless telephone system which is capable of connecting a plurality of mobile stations to a single base station over a radio link is disclosed. The mobile stations are classified into a master and slaves. While the master mobile station is capable of originating and receiving a telephone call, the other or slave mobile stations are only capable of receiving a telephone call.

6 Claims, 12 Drawing Figures

CORDLESS TELEPHONE SYSTEM

BACKGROUND OF THE INVENTION

The present invention relates to a cordless telephone system which is connected to a subscriber's line and, more particularly, to a cordless telephone system in which a plurality of mobile stations are connectable to a single base station by a radio link.

In a traditional cordless telephone system, mobile stations have been associated in one-to-one correspondence with base stations. State another way, it has been impracticable to use a plurality of mobile stations unless the same number of base stations as the mobile stations are installed sacrificing cost and space. Meanwhile, in a system wherein a plurality of mobile stations are connectable to a single base tation, allowing a telephone call to be placed on any one of the mobile stations brings about problematic situations. For example, where a cordless telephone is located at the storefront or like place to which anyone has easy access, troubles may occur concerning the settlement of the bill and, in addition, the chance for the authorized user of the telephone to get into connection upon origination of a call is unfairly reduced.

SUMMARY OF THE INVENTION

It is therefore an object of the present invention to provide a cordless telephone system which allows a plurality of mobile stations to be connected to a single base station while eliminating the drawbacks particular to the prior art systems as described above.

It is another object of the present invention to provide a generally improved cordless telephone system.

In a cordless telephone system including a single base station and a plurality of mobile stations which are connectable to the base station over a radio link of the present invention, each of the mobile stations is provided with an identification code which is different from identification codes assigned to the other mobile stations. The identification code is indicative of a master-slave relationship of the mobile station to the other mobile stations and a particular priority order of the mobile station with respect to reception of a telephone call. The base station is constructed to determine whether any of the mobile stations which has originated a telephone call is a master mobile station or a slave mobile station referencing identification code assigned to the particular mobile station and, if the mobile station is a master station, connect the mobile station to a subscriber's line to allow dial signals to be transmitted and, if it is a slave station, inhibit transmission of dial signals although connecting the mobile station to the subscriber's line. The base station is further constructed to, at the time of reception of a telephone call, transmit control signals sequentially to the mobile stations on a time division basis according to the order of priority. The master mobile station, therefore, is capable of originating and receiving a telephone call, while each of the slave mobile stations is capable of only receiving a telephone call.

In accordance with the present invention, a cordless telephone system which is capable of connecting a plurality of mobile stations to a single base station over a radio link is disclosed. The mobile stations are classified into a master and slaves. While the master mobile station is capable of originating and receiving a telephone call, the other or slave mobile stations are only capable of receiving a telephone call.

The above and other objects, features and advantages of the present invention will become more apparent from the following detailed description taken with the accompanying drawings.

DESCRIPTION OF THE PREFERRED EMBODIMENTS

Figure 1:
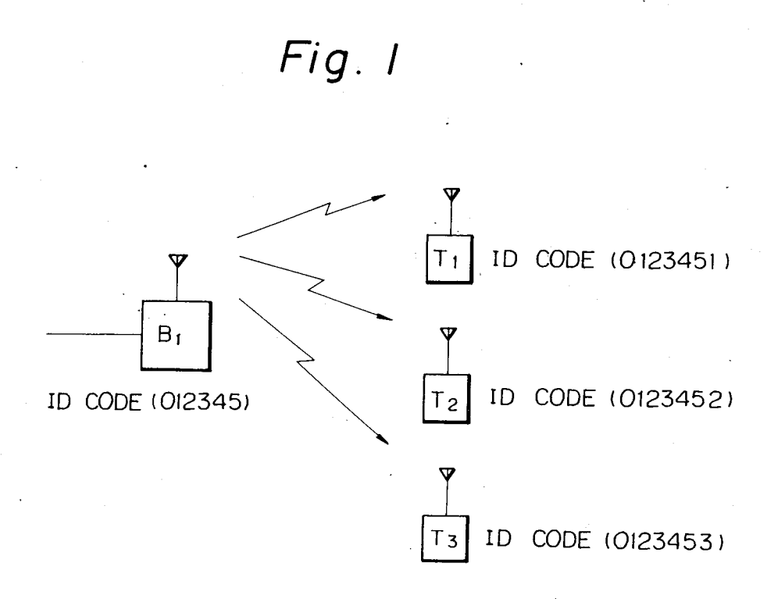
FIG. 1 is a diagram outlining the principle of the cordless telephone system in accordance with the present invention.

Referring to FIG. 1 of the drawings, the priniciple of the cordless telephone system of the present invention is shown using three mobile stations which are connectable to a single base station. As shown, a base station $B_1$ is assumed to have an identification (ID) code "012345", a mobile station $T_1$ and ID code "0123451", a modile station $T_2$ and ID code "0123452", and a mobile station $T_3$ and ID code "0123453". Specifically, in each of the ID codes assigned to the mobile stations $T_1$, $T_2$ and $T_3$, the six upper bits "012345" indicate that the mobile station is associated with the base station $B_1$ whose ID code is "012345", while the remaining one bit "1", "2" or "3" indicates a specific priority order of the mobile station to the other mobile stations with respect to reception of a telephone call as well as its master-slave relationship to the other mobile stations. Thus, assume that the mobile station $T_1$ is the master mobile station, that the mobile statons $T_1$, $T_2$ and $T_3$ have priority in this order concerning call reception, and that the base station $B_1$ identifies such arrangements referencing the seventh bit of the ID code of each mobile station.

Figure 2:
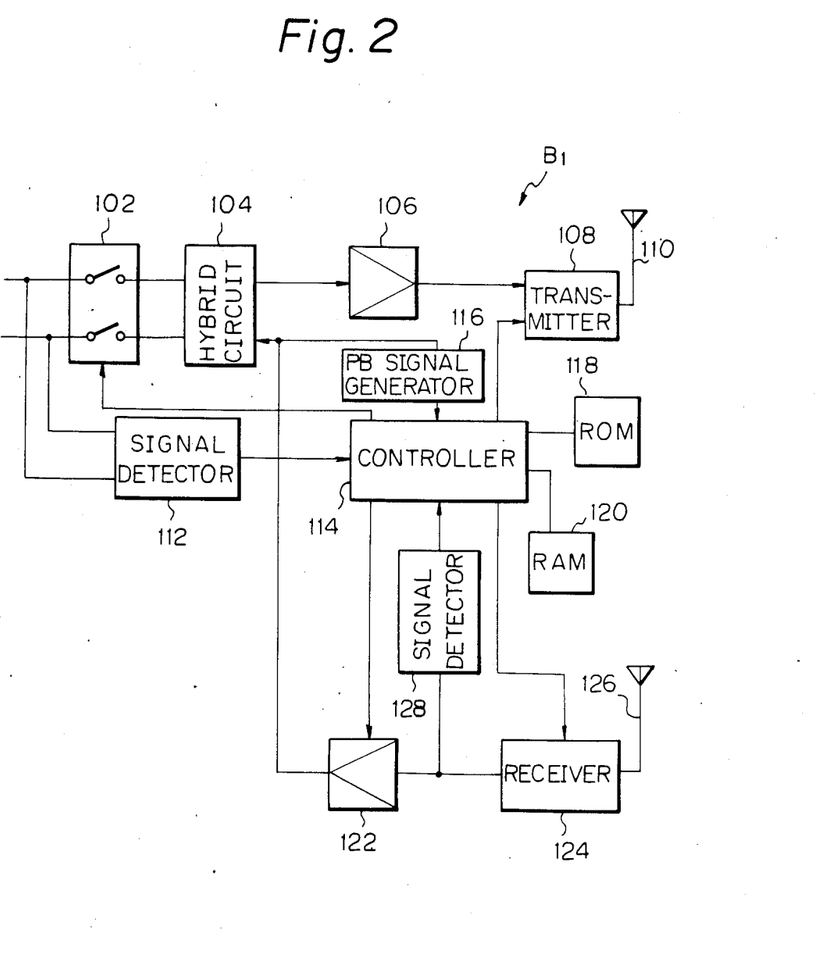
FIG. 2 is a block diagram of a base station included in the system of the present invention.
Figure 3:
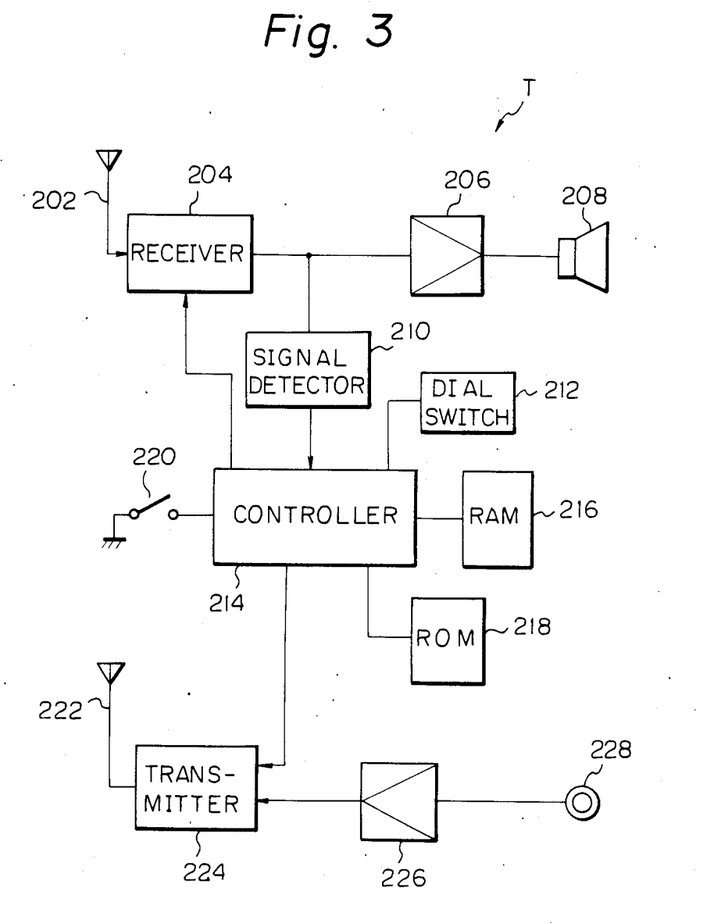
FIG. 3 is a block diagram of a mobile station also included in the system of the present invention.

A specific construction of the base station $B_1$ in accordance with the present invention is shown in FIG. 2, and that of any of the mobile stations $T_1$–$T_3$ in FIG. 3. As shown in FIG. 2, the base station $B_1$ comprises a relay switch 102, a hybrid circuit 104, an amplifier 106, a transmitter 108, a transmit antenna 110, a signal detector 112, a controller 114, a push button (PB) signal generator 116, a read only memory (ROM) 118, a random access memory (RAM) 120, an amplifier 122, a receiver 124, a receive antenna 126, and a signal detector 128. The mobile station T, as shown in FIG. 3, comprises a receive antenna 202, a receiver 204, an amplifier 206, a speaker 208, a signal detector 210, a dial switch 212, a controller 214, a RAM 216, a ROM 218, a switch 220, a transmit antenna 222, a transmitter 224, an amplifier 226, and a microphone 228.

Figure 4:
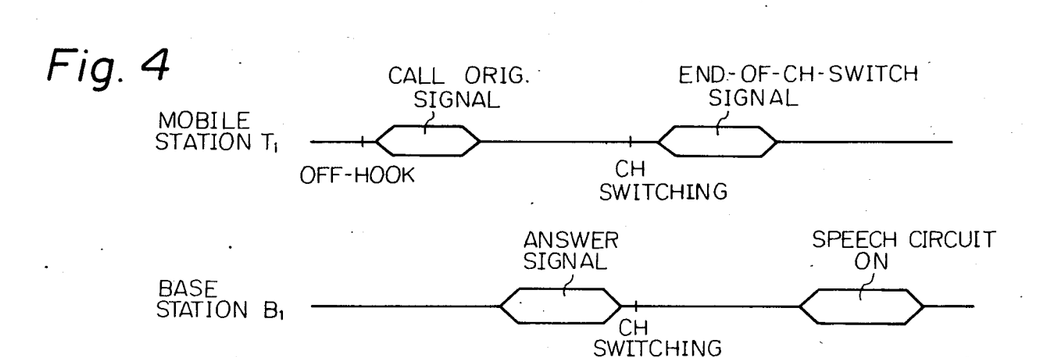
FIG. 4 is a timing chart demonstrating a call origination operation in accordance with the present invention.
Figure 5A:
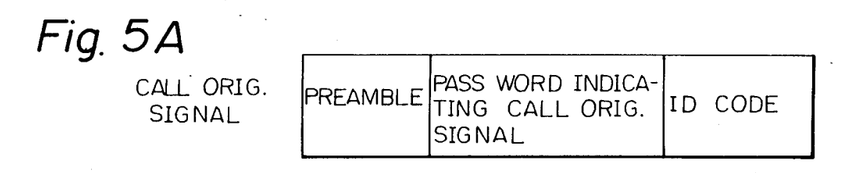
FIGS. 5A and 5B show formats of control signals in accordance with the present invention.

To place a telephone call, the base station and the mobile stations are operated as will be described with reference to the timing chart of FIG. 4 and the format of a call originating signal of FIG. 5A. While the description will proceed in realtion to a multi-channel system which includes a control channel, the same principle also applies to a case without a control channel.

The mobile station $T_1$ upon detection of off-hook transmits a call origination signal to the base station $B_1$. The call origination signal is formatted as shown in FIG. 5A. It is to be noted that a cordless telephone system without a control channel does not involve communication channel information. The base station $B_1$ detects the ID code out of the call origination signal by means of signal detector 128 to confirm that the station $T_1$ is the master station associated therewith. Then, the base station $B_1$ activates the radio link and, then, connects the station $T_1$ to the subscriber's line. When it is the slave mobile station $T_2$ that has originated the call, the base station $B_1$ detects the ID code by the signal detector 128 to see that the upper six bits thereof, "012345", are identical with the ID code assigned to the base station $B_1$ and that the calling mobile station is a slave station as indicated by the seventh bit of the ID code. In this instance, although activating the ratio link, the base station $B_1$ inhibits the delivery of dial signals by disenabling the PB signal generator 116 and, then, turning on the relay switch 102. Here, in the case of a rotary telephone, The base station $B_1$ prevents the controller 114 from delivering dialing pulse signals to the relay switch 102.

While the base station $B_1$ has been shown and described as connecting a calling slave mobile station to the subscriber's line which is connected to a switchboard, it may alternatively connect the calling station to the radio link only and not to the subscriber's line or connect it to none of the subscriber's line and radio link. The former alternative method may be employed to furnish the system with the function of an interphone or to change the master mobile system as will be described, while the latter alternative method may be relied upon to cut down the channel busy time.

Next, the call reception operation will be described with reference to FIGS. 5B, 6A, 6B, 7A and 7B. Two different approaches are available for this operation.

Figure 5B:
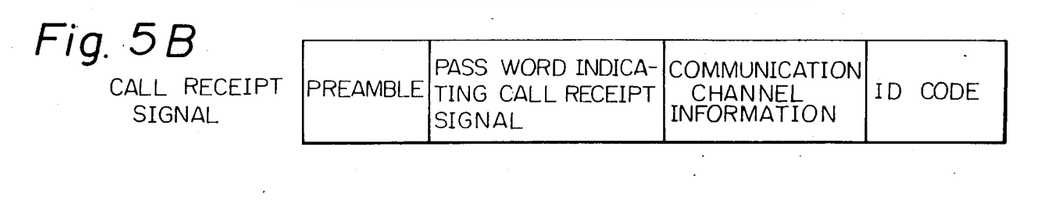
Figure 6A:
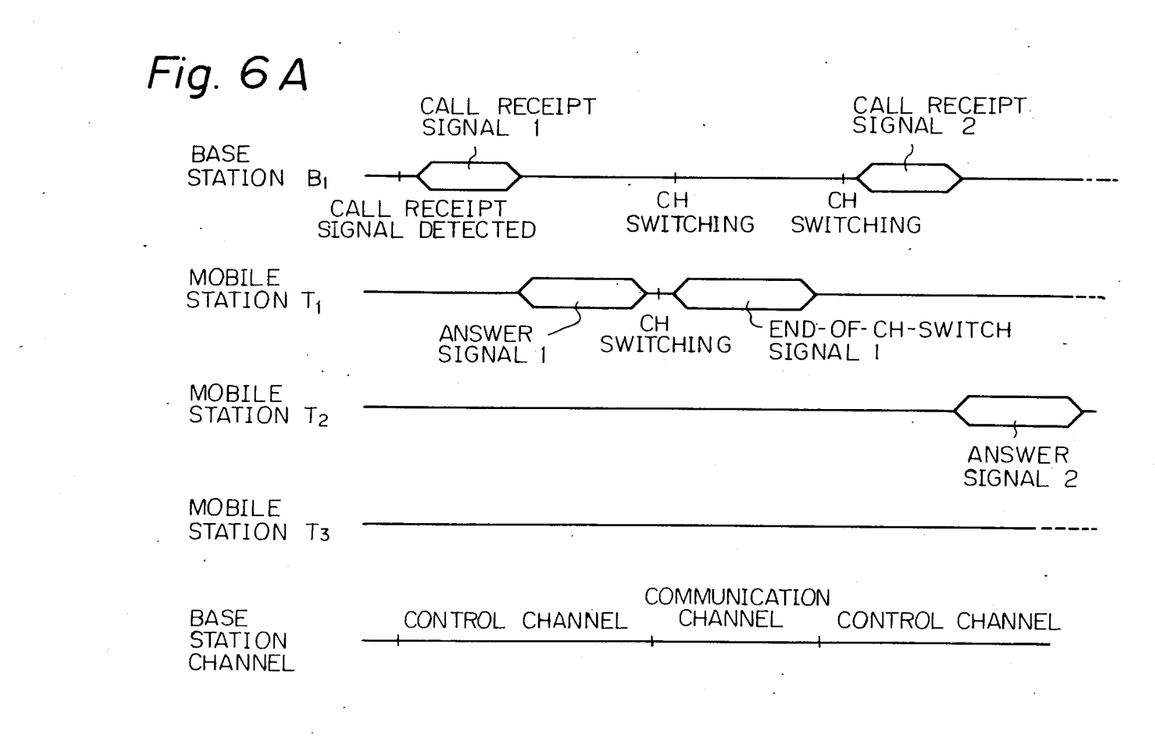
FIGS. 6A and 6B are timing charts representative of a first example of a call reception operation in accordance with the present invention.
Figure 6B:
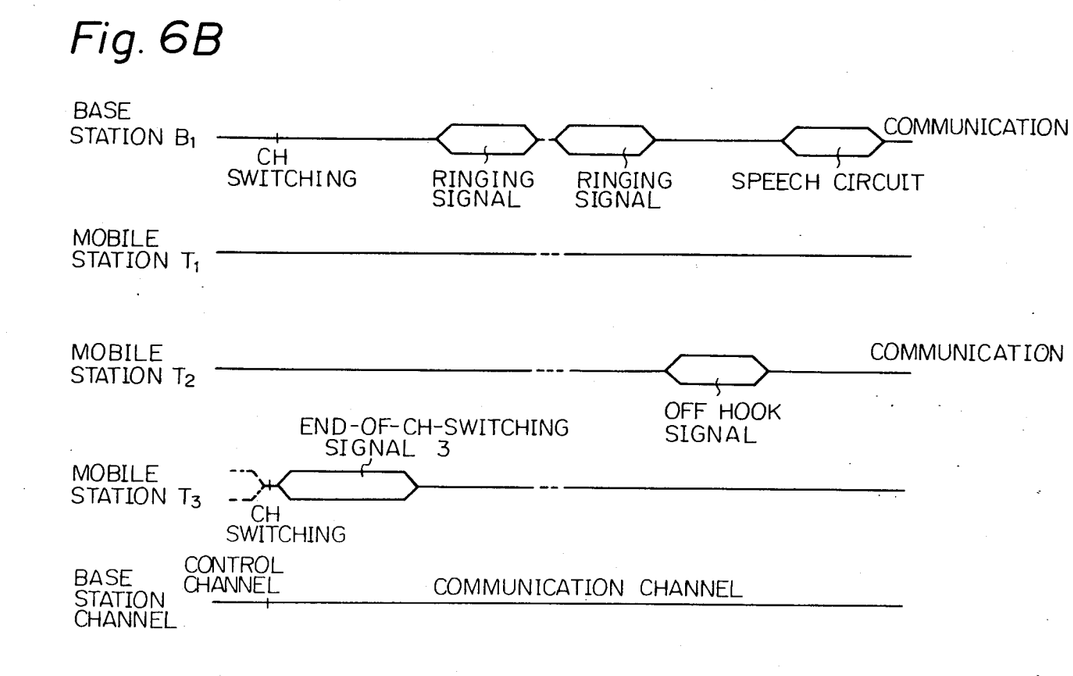

A first approach will be described with reference to the timing charts of FIGS. 6A and 6B. Again, assume that the cordless telephone system is of the multi-channel type. As the base station $B_1$ detects an incoming-call signal from the switchboard by the signal detector 112, it transmits to the mobile station $T_1$ having the highest priority a call reception signal which includes the ID code "0123451" and communication channel information over the control channel. The format of the call reception signal is shown in FIG. 5B.

Responsive to the call reception signal, the mobile station $T_1$ sends an answer signal to the base station $B_1$. Then, both the base station $B_1$ and the mobile station $T_1$ switch their channels, the latter transmitting an end-of-channel-switch signal to the former. Upon reception of the end-of-channel-switch signal, the base station $B_1$ restores the channel to control to transmit to the mobile station $T_2$ of the second priority a call reception signal which includes the ID code "0123452" and the previously mentioned communication channel information over the control channel. Thereafter, the base station $B_1$ signals the mobile station $T_3$ in the same manner. It is to be noted that the time division of the control signal as effected in the above-discussed connecting procedure is to prevent the mobile stations from interfering with each other and, for this reason, each of the mobile stations has to maintain its transmission section turned off except for the time of delivery of a control signal which is assigned thereto. When the base station $B_1$ has failed to receive the answer signal from the mobile station $T_1$, it does not switch the channel and immediately starts on the call reception operation meant for the next station $T_2$.

As the base station $B_1$ switches the cahnnel of all the mobile stations down to the station $T_3$, it transmits a ringing signal to the latter over the above-mentioned channel. When any of the mobile stations $T_1$, $T_2$ and $T_3$ has been off-hooked responsive to the ringing signal to send an off-hook signal to the base station $B_1$ the latter activates the radio link to set up communications.

Figure 7A:
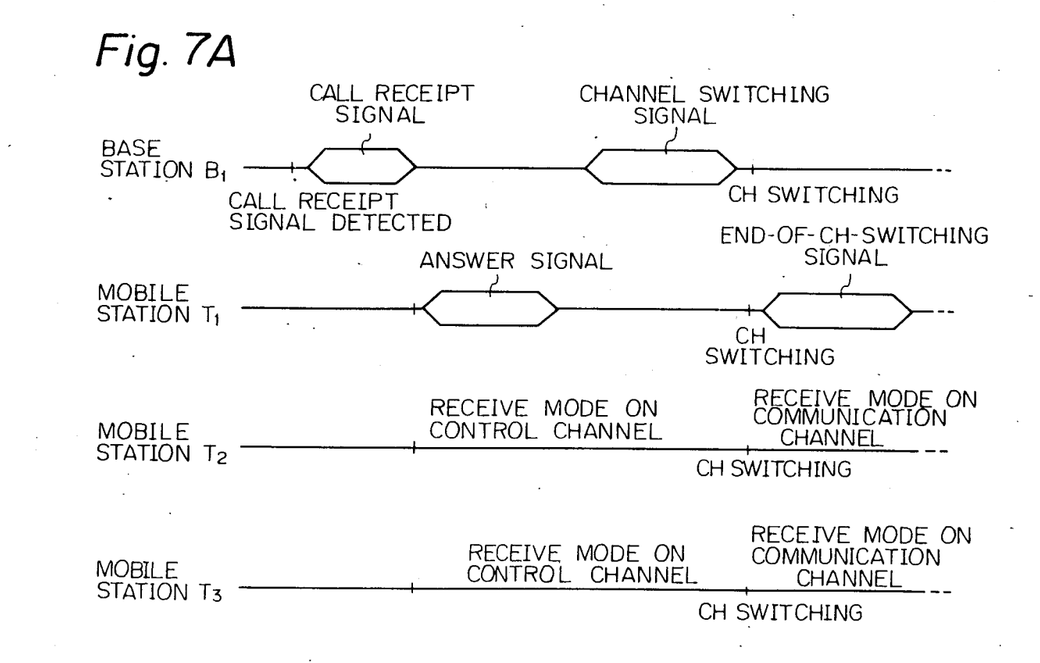
FIGS. 7A and 7B are timing charts representative of a second example of the call reception operation.
Figure 7B:
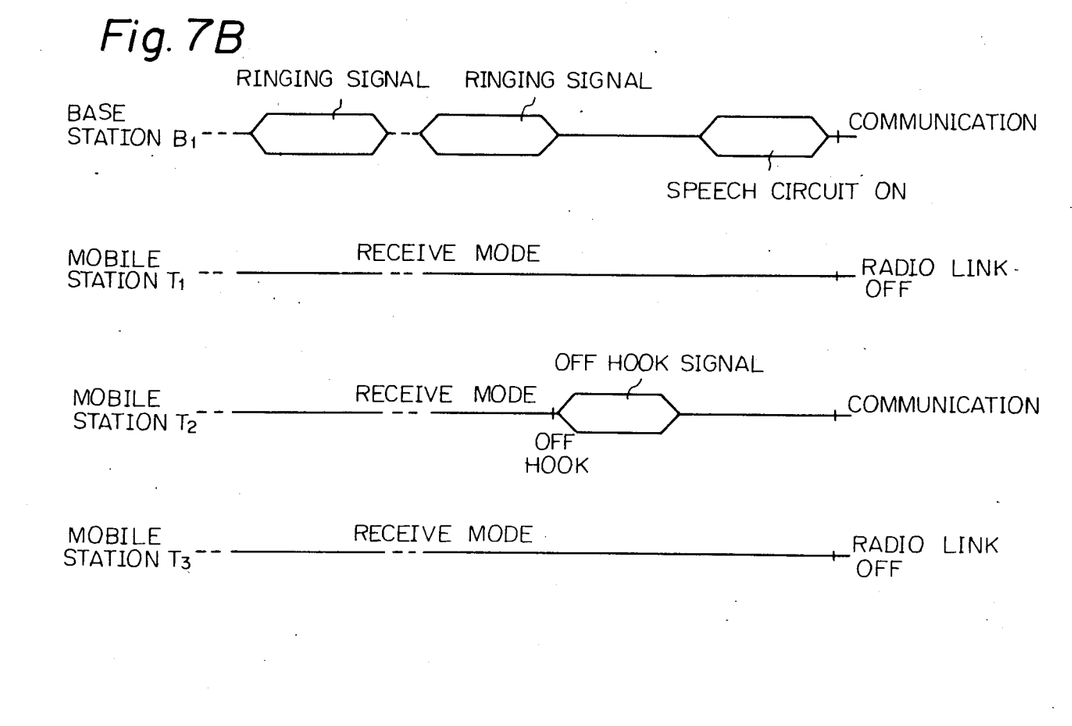

Referring to FIGS. 7A and 7B, a second approach for call reception in accordance with the present invention will be described. In this particular example, the base station $B_1$ responds to an incoming-call signal from the switchboard by transmitting over the control channel a call reception signal which includes the ID code assigned to the mobile station $T_1$, "0123451", and communication channel information. Then, each of the stations $T_1$-$T_3$ detects the ID code by means of the signal detector 210 and sees that the transmitting base station is the base station $B_1$ associated therewith as indicated by the upper six bits of the ID code "012345". In this condition, each of the stations $T_1$-$T_3$ stores the communication channel information in RAM 216 and remains in a receive mode. In the meantime, the master mobile station $T_1$ identifies the seventh bit of the received ID code, "1", which is identical with that of the own ID code, returning an answer signal to the base station $B_1$. Responsive to the answer signal, the base station $B_1$ transmits a channel switching signal to switch the channels of the mobile stations $T_1$-$T_3$ while switching its own channel. Upon completion of the channel switching, the mobile station $T_1$ sends and end-of-channel-switch signal to the base station $B_1$. During that period of time, the other mobile stations $T_2$ and $T_3$ maintain only their receivers activated and do not transmit any signal. The base station $B_1$ which has received the end-of-the-channel-switch signal from the station $T_1$ transmits a ringing signal to the mobile stations $T_1$-$T_3$. As any one of the mobile stations $T_1$-$T_3$ is off-hooked thereafter, it sends an off-hook signal to the base station $B_1$ to cause the latter to activate the radio link and, thereby, set up communications.

In the above control flow, when the base station $B_1$ has failed to receive the answer signal from the mobile station $T_1$ after the transmission of the call reception signal, it replaces the ID code meant for the station $T_1$ with the one meant for the station $T_2$, "0123452", and transmits the call reception signal again. This is followed by the same procedure as above-described except that the station $T_2$ is substituted for the station $T_1$. In this manner, a plurality of mobile stations can receive a telephone call from a single base station at the same time.

Figure 8:
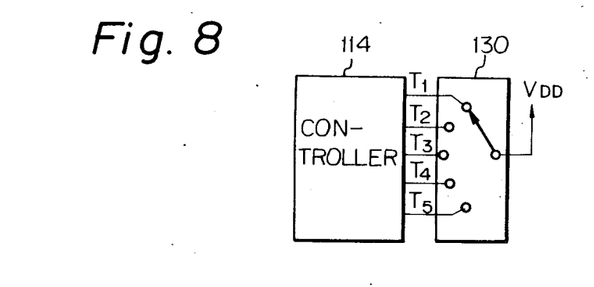
FIG. 8 is a diagram showing a specific example of a means for allowing one of slave mobile stations of the present invention to become a master station.

Now, it may occur that the master mobile station is located outside the radio communication range or in failure. In this respect, it would be very convenient and time-saving to install in the sytem a means for allowing one to place a telephone call on any one of the accessible slave mobile stations. A specific construction for implementing such a means is shown in FIG. 8. In FIG. 8, the base station B₁ includes a master mobile station selection switch 130 which is connected to the controller 114. In this construction, the switch 130 is manipulatable to decide a master mobile station (in the previously described example, the seventh bit of the ID code) at the base station B₁, while discriminating the master-slave relationship in the event of call origination on any of the mobile stations.

Figure 9:
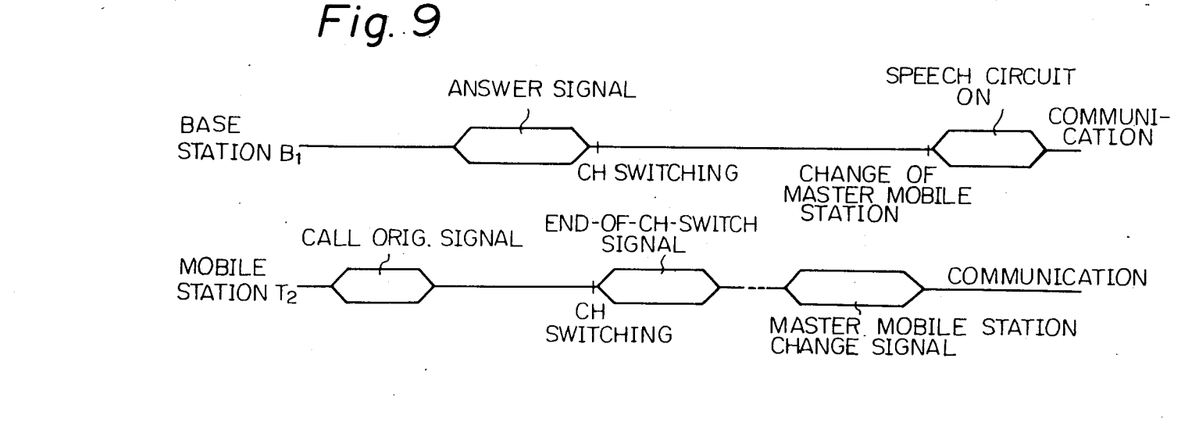
FIG. 9 is a timing chart representative of another specific example of the same means.

Referring to FIG. 9, an alternative to the construction of FIG. 8 is shown in a timing chart. As shown, when the slave mobile station T₂ has originated a call, the base station B₁ temporarily connects itself to the station T₂. In this condition, the authorized user of the station T₂ may transmit through the slave station a control signal which indicated a change of the master station by suitable manipulation for switching, such as dialing a particular code number. Then, the base station B₁ updates its store with the ID code assigned to that mobile station which has transmitted the control signal, thereby replacing the master mobile station which is allowed to originate a call.

In summary, it will be seen that the present invention provides a cordless telephone system which allows a single base station to supervise a plurality of mobile stations, thereby cutting down the cost. In addition, the system may be constructed to allow only a single mobile station to originate and receive calls to eliminate various anticipated troubles.

Various modifications will become possible for those skilled in the art after receiving the teachings of the present disclosure without departing from the scope thereof.

What is claimed is:

1. A cordless telephone system including a single base station and a plurality of mobile stations which are connectable to the base station over a radio link:

said mobile stations each being provided with an identification code which is different from indentification codes assigned to the other mobile stations, said identification code being indicative of a master-slave relationship of said mobile station to the other mobile stations and a particular priority order of said mobile station with respect to reception of a telephone call;

said base station being constructed to determine whether any of the mobile stations which has originated a telephone call is a master mobile station or a slave mobile station referencing the identification code assigned to said particular mobile station and, if said mobile station is a master station, connect said mobile station to a subscriber's line to allow dial signals to be transmitted and, if said mobile station is a slave station, inhibit transmission of dial signals although connecting the mobile station to the subscriber's line;

said base station being further constructed to, at the time of reception of a telephone call, transmit control signals sequentially to the mobile stations on a time division basis according to the order of priority;

whereby the master mobile station is capable of originating and receiving a telephone call, while each of the slave mobile stations is capable of only receiving a telephone call.

2. A cordless telephone system as claimed in claim 1, wherein the base station is further constructed to, at the time of reception of a telephone call, exchange control signals only with the master mobile station or any of the slave mobile stations which replaces the master mobile station, while causing the other mobile stations to receive signals and not to transmit signals.

3. A cordless telephone system as claimed in claim 1, wherein the base station comprises a switch for selecting any one of the mobile stations as the master mobile station, and means for determining any of the mobile stations which is designated by said switch as the master mobile station and enabling said mobile station to transmit signals, whereby one of the slave mobile stations is allowed to function as the master mobile station when the master mobile station is located outside a predetermined radio communication range or in failure.

4. A cordless telephone system as claimed in claim 3, wherein the base station further comprises a means for temporarily connecting any of the slave mobile stations which has originated a call to the radio link, each of the slave mobile stations comprising a means for transmitting a master mobile station change signal to the base station when an owner of said slave mobile station has entered a code number assigned to said slave mobile station, the base station further comprising a means for determining upon reception of the master mobile station change signal that the mobile station which has transmitted the signal is the master mobile station concerning origination of a telephone call, whereby one of the slave stations functions as the master slave station.

5. A cordless telephone system as claimed in claim 1, wherein the base station is further constructed to determine whether any one of the mobile stations which has originated a telephone call is the master mobile station or the slave mobile station referencing the identification code and, if said mobile station is the master mobile station, connect the mobile station to the subscriber's line and, if the mobile station is the slave mobile station, connect the mobile station to the radio link only.

6. A cordless telephone system as claimed in claim 1, wherein the base station is further constructed to determine whether any one of the mobile stations which has originated a call is the master station or the slave station and, if said mobile station is the master, connect the mobile station to the subscriber's line and, if the mobile station is the slave, prevent the radio link from being connected to the mobile station.

* * * * *